United States Patent [19]

Imamura

[11] Patent Number: 4,769,718
[45] Date of Patent: Sep. 6, 1988

[54] IMAGE PROCESSING APPARATUS

[75] Inventor: Kenji Imamura, Himeji, Japan

[73] Assignee: Ushio Denki Kabushiki Kaisha, Tokyo, Japan

[21] Appl. No.: 947,423

[22] Filed: Dec. 29, 1986

[30] Foreign Application Priority Data

Jan. 7, 1986 [JP] Japan ............................. 61-311
Mar. 27, 1986 [JP] Japan ......................... 61-67276
Mar. 27, 1986 [JP] Japan ......................... 61-67277

[51] Int. Cl.$^4$ .............................................. H04M 1/04
[52] U.S. Cl. .................................... 358/285; 358/293; 358/294; 362/341; 362/347
[58] Field of Search ................. 358/285, 293, 294; 362/327, 341, 347; 355/67

[56] References Cited

U.S. PATENT DOCUMENTS 4,217,611  8/1980  Ogawa ................................ 358/285
4,424,535  1/1984  Rothbart et al. .................... 358/285
4,620,781 11/1986  Miyamoto ........................... 358/285
4,677,495  6/1987  Ito et al. ............................ 358/285

Primary Examiner—Edward L. Coles, Sr.
Attorney, Agent, or Firm—Robert F. Ziems

[57] ABSTRACT

An image processing apparatus is equipped with an original document illuminating lamp, a reflector arranged in association with the lamp and having a color-compensating anodic oxidation coating formed on at least a part of a reflecting surface of the reflector, and a photosensitive member adapted to receive light from an original document upon exposure of the original document to light from the lamp and having an oversensitive range in the spectral sensitivity characteristics thereof. The reflector is made of aluminum or an aluminum alloy. Owing to the provision of the color-compensating anodic oxidation coating, the reflectivity of the reflector to light in a wavelength region corresponding to the oversensitive range of the photosensitive member is smaller than its reflectivity to light in wavelength region other than the first-mentioned wavelength region.

13 Claims, 7 Drawing Sheets

IMAGE PROCESSING APPARATUS

BACKGROUND OF THE INVENTION

1. Field of the Invention:

This invention relates to an optical picture reader suitable for use, for example, in a facsimile or optical character recognition apparatus or an image processing apparatus for a copying machine or the like.

2. Description of the Prior Art:

An optical picture reader employed for example in an optical character recognition apparatus or the like comprises an optical system adapted to illuminate a picture to be read and to form an optical image corresponding to the thus-read picture and photo detectors for receiving the optical image formed by the optical system.

Such an optical system may for example be constructed of a tubular light-source lamp, a gutter-like reflector surrounding the lamp, and one or more optional plane reflectors interposed in the optical path extending to photo detectors as needed. By the light-source lamp and gutter-like reflector, a long, narrow, strip-like illuminated zone which extends in a widthwise direction is formed on a picture to be read. The picture to be read is shifted relative to the illuminated zone, thereby scanning the picture at the illuminated zone and forming an optical image of the whole picture.

As pictures to be read, there are those having various colors such as black color, blue color, red color, orange color and green color at their picture areas. Hence, it is generally desirable that reading can be always effected with high accuracy irrespective of the kind of the color of a picture to be read.

An optical system constructed, for example, by using a halogen incandescent lamp as a light-source lamp and an aluminum reflector has such characteristics that the spectral sensitivity increases almost linearly in the visible region as indicated by Curve I in FIG. 1, which diagrammatically illustrates the spectral sensitivity characteristics of a light source composed of a halogen incandescent lamp and photo detectors in comparison with spectral luminous efficiency. In order to improve the reading accuracy by using such an optical system, it is desirable that the combined spectral sensitivity characteristics of the optical system and photo detectors closely resemble the spectral luminous efficiency of a man for photopic vision, which is indicated by Curve II in the same figure. For this purpose, it is desirable that the spectral sensitivity of the photo detectors has such characteristics as shown by Curve III in the same figure.

As photo detectors on the other hand, photo detectors making use of the photovoltaic effect of a p-n junction of silicon such as silicon photo diodes and silicon photo transistors are used widely. These photo detectors have sensitivity, generally, in a wavelength region of 400-1100 nm with the maximum peak wavelength falling within a range of 800-900 nm. Their spectral sensitivity hence contains an oversensitive part, i.e., a part, which is far more sensitive compared with the spectral luminous efficiency of a man, in a longer wavelength range of the visible range. When photo detectors having such spectral sensitivity characteristics are used to read a picture having a red color by way of example, their sensitivity to light reflected from an area of the red color in the picture is so high that the photo detectors show substantially the same characteristics as their characteristics to light reflected from an area of a white color in the picture. This results in a problem of lowered reading accuracy.

As a method for overcoming the above-described problem, it has already been known to interpose a suitable filter in the optical path extending from the light-source lamp to the photo detectors so as to modify the spectral characteristics of the resulting optical image, whereby the quantity of light, which has a wavelength corresponding to the oversensitive range and enters the photosensitive detectors, is reduced to improve the reading accuracy.

The above method have however developed other problems. Since the filter is susceptible to dust deposition on its surface and also to scratches, special care must be exercised upon handling the filter. The filter requires a special bracket for holding same, whereby the assembly of the apparatus is rendered more complex. Moreover, a filter of this sort generally has a multi-layered coating. It is hence expensive, thereby increasing the manufacturing cost of the apparatus, and has poor heat resistance and thus a shorter service life.

There have recently been developed photo detectors in each of which an infrared absorbing filter is provided with a planar silicon sensor so as to make its spectral sensitivity closer to the spectral luminous efficiency of a man. However, there are still oversensitive parts in both shorter and longer wavelength ranges in the visible region as shown by Curve IV in FIG. 1 even in the case of such photo detectors. Their sensitivity is still very high, for example, to blue colors corresponding to 400-500 μm or to red colors corresponding to 600-700 μm so that they involve a problem of low reading accuracy.

CCD (charge coupled device) line sensors, which have found wide-spread utility as photo detectors having elongated light-receiving surfaces, also have oversensitive parts in both shorter and longer wavelength ranges in the visible region as indicated by Curve V in FIG. 1. They are hence accompanied by a similar problem.

On the other hand, a copying machine such as electrophotographic copying machine generally includes an optical system for illuminating an original document to form an optical image corresponding to the original document, a photosensitive member adapted to be exposed to the optical image of the original document so as to form an electrostatic latent image thereon, a developing means for visualizing the electrostatic latent image with a toner, and a fixing means for transferring a toner image formed by the above development onto a transfer material such as a sheet of paper and then forming a fixed image there.

The above-described optical system may be composed, for example, by a tubular lamp for illuminating an original document, a gutter-like mirror surrounding the lamp, one or more optional plane mirrors interposed in the optical path extending to a photosensitive member as needed, and a image-forming lens for focusing an optical image of the original document on the photosensitive member. By the original document illuminating lamp and gutter-like mirror, there is formed an elongated strip-like illumination zone which extends in the widthwise direction of an original document table made of transparent glass. The original document or optical system is shifted so that the illumination zone is scanned relative to the original document to form an optical image of the entire original document.

As original documents to be copied, there are those having various colors such as black color and red color at their marked areas. Hence, it is generally desirable that their copies formed by a copying machine are of good quality having the same density irrespective of the types of the colors in the marked areas of the original documents.

However, conventional copying machines are accompanied by a problem that the density of a marked area of a resulting copy corresponding to a marked area of a red color in an original document becomes considerably lower compared with the density of another marked area of the same copy corresponding to another marked area of a black color in the original document. Organic photosensitive members (may hereinafter be called merely "OPC photosensitive members") which comprise organic photoconductor or selenium-base photosensitive members made of a photoconductor of selenium-arsenic alloy are widely used, for example, in electrophotographic copying machines. Of these, OPC photosensitive members made, for example, of a eutectic mixture such as a triphenylmethane mixture and a thiapyrylium salt and selenium-base photosensitive members made of AsSe have oversensitive parts, i.e., parts, which are far more sensitive compared with the spectral luminous efficiency, in a wavelength region of 550-650 nm, namely, a wavelength region close to red colors. When a copying machine making use of a photosensitive member having such spectral sensitivity characteristics is used to form a duplicate copy of an original document having a marked area of a red color, its sensitivity to light reflected from the area of the red color in the original document is so high that it exhibits characteristics similar to its characteristics to light reflected from an area of a white color in the original document. As a result, the density of a copied area corresponding to the marked area of the red color in the original document is low in the duplicate copy, thereby developing a problem that its sharpness is lower than that of copied areas corresponding to marked areas of a black color in the same original document. On the other hand, the spectral sensitivity of OPC photosensitive members made, for example, of polyvinylcarbazole and trinitrofluorenone and seleniumbase photosensitive members made, for instance, of $As_2Se_3$ or SeTe contain oversensitive parts, i.e., parts, which are far more sensitive compared with the spectral luminous efficiency, in a wavelength region of 400-550 nm. When a copying machine making use of a photosensitive member having such spectral sensitivity characteristics is used to form a duplicate copy of an original document written in a blue ink or an original document prepared as a so-called blue print for example, its sensitivity to light reflected from a marked area of a blue color in the original document is so high that a problem similar to that described above is developed.

As a method for overcoming the above-described problem, it has already been known in a conventional electrophotographic copying machine to interpose a suitable filter in the optical path extending from the original document illuminating lamp to the photosensitive member so as to modify the spectral characteristics of the optical image of the original document, whereby the quantity of light reflected from a marked area of a red or blue color in the original document is reduced on the photosensitive detectors so as to compensate the insufficient density of the marked area of the duplicate copy corresponding to the marked area of the red or blue color in the original document.

The above method have however developed other problems. Since the filter is susceptible to dust deposition on its surface and also to scratches, special care must be exercised upon handling the filter. The filter requires a special bracket for holding same, whereby the assembly of the apparatus is rendered more complex. Moreover, a filter of this sort generally has a multi-layered coating. It is hence expensive, thereby increasing the manufacturing cost of the apparatus, and has poor heat resistance and thus a shorter service life.

SUMMARY OF THE INVENTION

The present invention has been completed with the foregoing in view. An object of this invention is therefore to provide an image processing apparatus which can modify the spectral characteristics of the optical image of each original document in accordance with the spectral sensitivity characteristics of its photosensitive member by simple and economical means to perform color compensation, thereby permitting good image processing.

A specific object of this invention is to provide an image processing apparatus useful as an image reader which can modify the optical characteristics of the optical image of each original document and can hence read the original document with high accuracy.

Another object of this invention is to provide an image processing apparatus useful as a copying machine which even when an original document contains a marked area of a red or blue color, can give a sufficient density to the corresponding marked area of its duplicate copy and can hence provide the duplicate copy with good quality.

In one aspect of this invention, there is thus provided an image processing apparatus equipped with an original document illuminating lamp, a reflector arranged in association with the lamp and having a color-compensating anodic oxidation coating formed on at least a part of a reflecting surface of the reflector, and a photosensitive member adapted to receive light from an original document upon exposure of the original document to light from the lamp and having an oversensitive range in the spectral sensitivity characteristics thereof. The reflector is made of aluminum or an aluminum alloy. Owing to the provision of the color-compensating anodic oxidation coating, the reflectivity of the reflector to light in a wavelength region corresponding to the oversensitive range of the photosensitive member is smaller than its reflectivity to light in wavelength region other than the first-mentioned wavelength region.

In another aspect of this invention, there is also provided an image processing apparatus equipped with an original document illuminating lamp, a reflector arranged surrounding the lamp and having a color-compensating anodic oxidation coating formed on at least a part of a reflecting surface of the reflector, and a photosensitive member adapted to receive light from an original document upon exposure of the original document to light from the lamp and having an oversensitive range in the spectral sensitivity characteristics thereof. The reflector is made of aluminum or an aluminum alloy. Owing to the provision of the color-compensating anodic oxidation coating, the reflectivity of the reflector to light in a wavelength region corresponding to the oversensitive range of the photosensitive member is smaller than its reflectivity to light in wavelength region other than the first-mentioned wavelength region.

According to the present invention, there is provided the aluminum or aluminum alloy reflector having, on the reflecting surface of the reflector, the color-compensating anodic oxidation coating which gives the reflector a small reflectivity for light in the wavelength region corresponding to the oversensitive range in the spectral sensitivity of the photosensitive member. The reflector thus exhibits both functions, that is, serves not only as a reflecting surface but also as a filter. As a result of reflection of light by the reflecting surface of the reflector, the proportion of reflected light having wavelengths corresponding to the oversensitive range of the photosensitive member is hence reduced relative to the proportion of reflected light of other wavelengths so that the spectral sensitivity of the whole system of the optical system, which includes the light-source lamp and reflector, becomes closer to the spectral luminous efficiency of a man. A picture can hence be read with high accuracy where the photosensitive member is composed of photo detectors. If the photosensitive member comprises a photoconductor, the proportion of reflected light having a hue in a so-called complementary relation with a hue corresponding to the oversensitive range increases relative to the proportion of the other reflected light. As a result, an optical image of an original document is formed on the photosensitive member in such a state that the quantity of light reflected from a marked area of the above hue in the original document is reduced relative to the quantity of light reflected from other marked areas. Use of a photosensitive member, the spectral sensitivity of which has an oversensitive range in a specific wavelength region, can consequently form a good duplicate copy because the density of the area of the duplicate copy corresponding to the area of the hue in the original document becomes sufficient.

Owing to the provision of the color-compensating anodic oxidation coating on the aluminum or aluminum alloy mirror employed in combination with the lamp adapted for the illumination of an original document, the original document is illuminated by light reflected by the mirror. It is hence possible to achieve color compensation without impairing the sharpness of the optical image of the original document at all. If a color-compensating anodic oxidation coating is provided, unlike the present invention, on a mirror which reflects an optical image of an original document, the sharpness of the optical image of the original document may be reduced due to the roughness of the color-compensating anodic oxidation coating in some instances.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Figure 1:
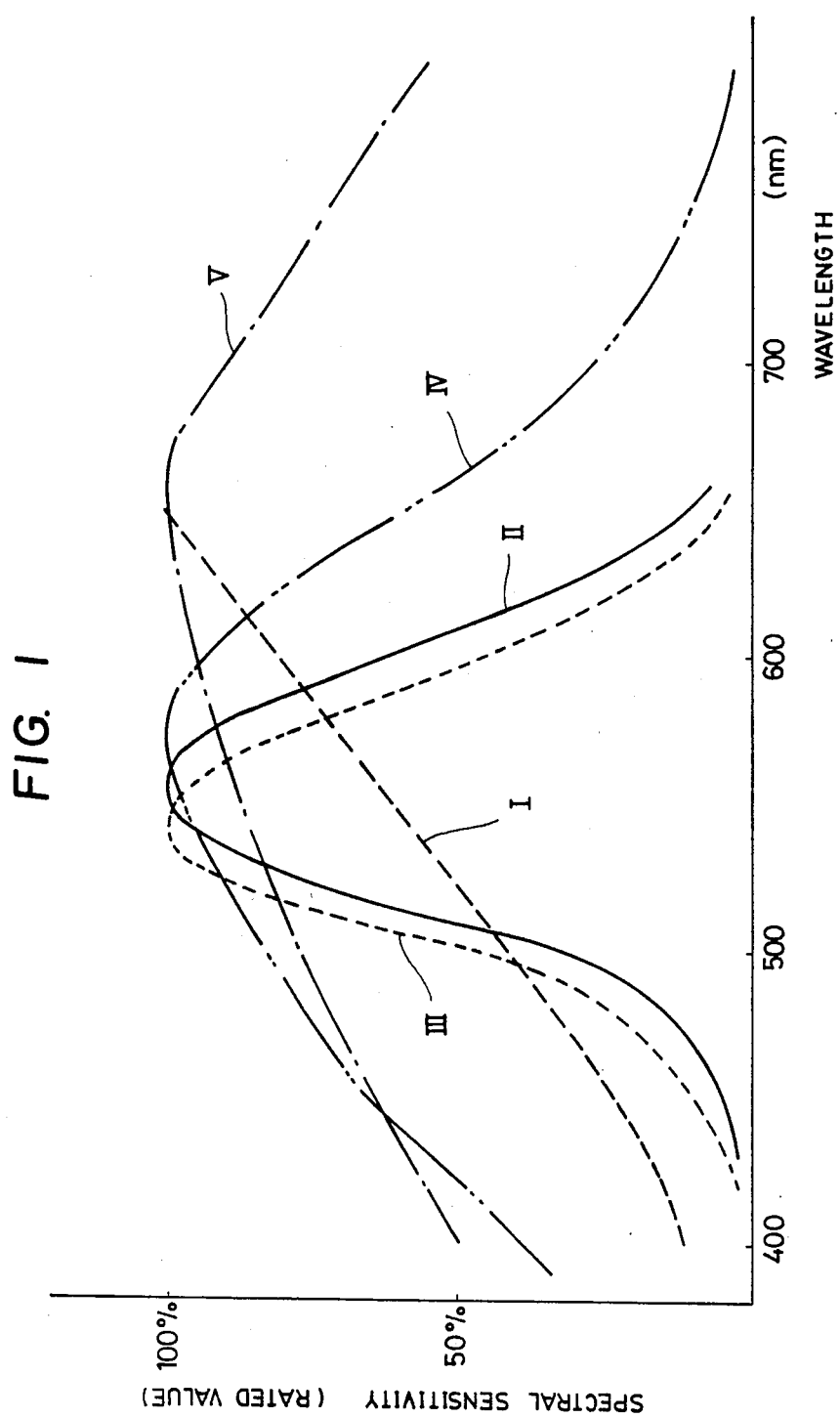
FIG. 1 illustrates diagrammatically the spectral sensitivity characteristics of a light source composed of a halogen incandescent lamp and photo detectors in comparison with spectral luminous efficiency.
Figure 2:
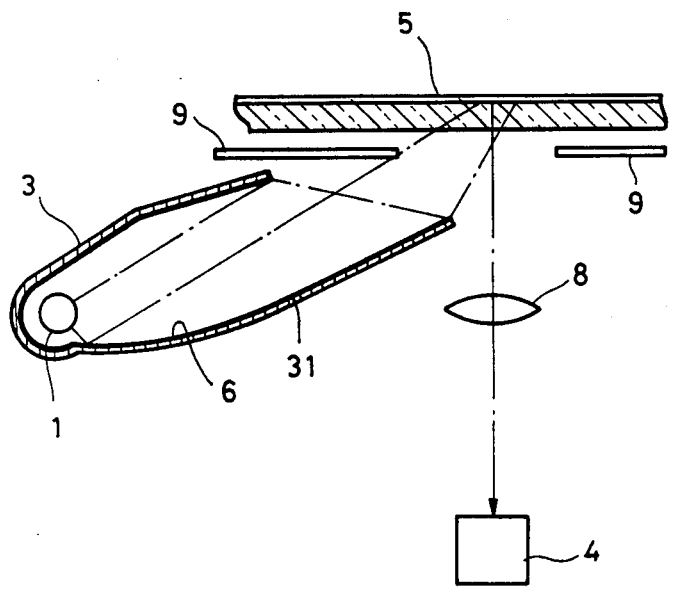
FIG. 2 is a simplified, schematic and fragmentary view of a picture reader according to one embodiment of this invention.

Referring now to FIG. 2, there are shown a picture-illuminating lamp 1, a reflector 3, photo detectors 4, a picture 5, an image-forming lens 8 and light-shielding plates 9.

Figure 3:
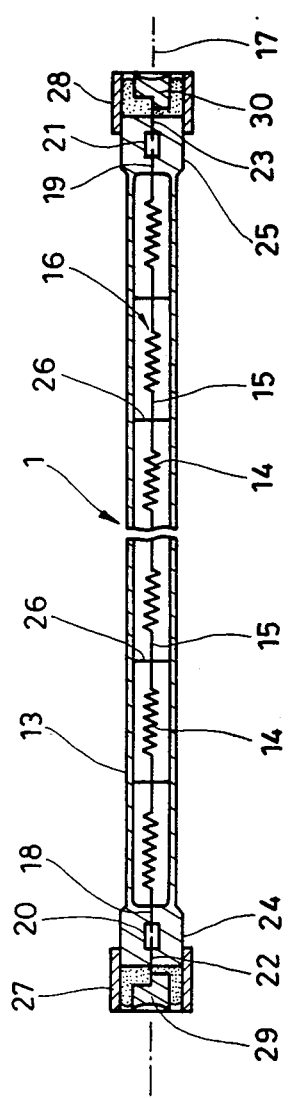
FIG. 3 is a schematic longitudinal crosssection of one example of a lamp adapted for the illumination of an original document.

As shown in FIG. 3, the lamp 1 may for example be a halogen incandescent lamp, in which a filament assembly 16 composed for example of coil-like luminous portions 14 and non-luminous straight portions 15 both made of tungsten and arranged alternately is arranged within an elongated tubular envelope 13 made of fused silica in such a way that the filament assembly 16 extends along the longitudinal axis of the tubular envelope 13. Numerals 18,19 indicate inner leads, which are connected at the inner ends thereof to both ends of the filament assembly 16 and at the outer ends thereof to the inner ends of associated metal foils 20,21. The metal foils 20,21 are made of molybdenum for example and are sealed within sealed end portions 24,25 respectively. The tubular envelope 13 is hermetically sealed at these metal foils 20,21. Designated at numerals 22,23 are outer lead wires, which are connected at the inner ends thereof to the metal foils 20,21. The other ends of the outer lead wires 22,23 extend out through their corresponding sealed end portions 24,25. There are also depicted supports 26, tubular bases 27,28 fixed over the sealed end portions 24,25 respectively, and contacts 29,30 held in place with a bond within cylindrical recesses of the bases 27,28 and connected electrically to the outer lead wires 22,23 respectively.

The reflector 3 has a gutter-like configuration surrounding the lamp 1 and is made of aluminum or an aluminum alloy. A layer of a color-compensating anodic oxidation coating (hereinafter called merely "color-compensating coating layer") 6 is provided, for example, over the entire area of a reflecting surface 31 of the reflector 3.

The color-compensating coating layer 6 has such reflection characteristics as compensating an oversensitive range in the spectral sensitivity of the photo detectors 4 which have a photovoltaic function. Based on the characteristics of the spectral sensitivity of the photo detectors 4 employed, the type of the color-compensating coating layer 6 is chosen.

For example, when the photo detectors 4 has a oversensitive part, in which the sensitivity is much higher compared with the spectral luminous efficiency of a man, in either one wavelength range of shorter and longer wavelength ranges of the visible regions, the color-compensating coating layer 6 capable of lowering the light reflectivity for the wavelength range corresponding to the oversensitive part is provided on the reflecting surface 31.

For example, when the photo detectors 4 has oversensitive parts, in each of which the sensitivity is much higher compared with the spectral luminous efficiency of a man, in both wavelength ranges of shorter and longer wavelength ranges of the visible regions, a color-compensating coating layer capable of lowering the light reflectivity for the wavelength range corresponding to the shorter wavelength range of the visible region is provided, for example, at one area of the reflector 31 and another color-compensating coating layer capable of lowering the light reflectivity for the wavelength range corresponding to the longer wavelength range of the visible region is provided at the other area of the reflector 31.

Specifically, it is possible to lower the light reflectivity for a desired wavelength region by selecting the hue of the color-compensating coating layer. In a color-compensating coating layer for lowering the light reflectivity for a longer wavelength range of the visible region for example, it is necessary to choose as its hue a bluish hue which is in a complementary relation with the hue of light in the longer wavelength range. In a color-compensating coating layer for lowering the light reflectivity for a shorter wavelength range of the visible region on the other hand, it is necessary to select as its hue a yellowish hue which is in a complementary relation with the hue of light in the shorter wavelength range. If it is also desired to lower the light reflectivity for another wavelength range, it is only necessary to choose the hue of the color-compensating coating layer in the same manner.

The preferable thickness of the color-compensating coating layer 6 may usually be 1 µm or less. If this thickness should exceed 1 µm, the reflectivity will generally be lowered for the entire visible light and as a result, the efficiency of light utilization will be reduced.

The reflecting surface having such a color-compensating coating layer 6 can be obtained by subjecting aluminum or an aluminum alloy, which is the material forming the reflector, to a coloring treatment by the so-called anodic oxidation process. The color-compensating coating layer 6 may be formed by a suitable technique, for example, an alloy-dependent coloring technique making use of an alloy component; a natural coloring technique such as an electrolyte coloring technique applied in an electrolyte; a dyeing technique for coloring an anodic oxidation coating with an organic dye or inorganic dye; an electrolytic coloring technique such as an alternating current electrolytic coloring technique for coloring an anodic oxidation coating by subjecting the coating to alternating current electrolysis in an electrolyte containing a metal salt, or a direct current electrolytic coloring technique for coloring an anodic oxidation coating by subjecting the coating to an intermediate treatment and then to direct current electrolysis in an electrolyte containing a metal salt; or the like.

As the photo detectors, it is possible to use, for example, photo detectors utilizing photovoltaic effect of p-n junction of silicon such as silicon photodiodes or silicon phototransistors, photo detectors fabricated by providing infrared absorbing filters with planar silicon sensors, CCD sensor, and any other photo detectors. In the illustrated embodiment, the photo detectors 4 may each have an elongated narrow light-receiving surface so as to conform the width of an optical image of a picture to be read.

In the above-described embodiment, the reflector 3 made of aluminum or an aluminum alloy has a color-compensating coating layer 6 on the reflecting surface 31 so as to compensate the oversensitive part of the spectral sensitivity of the photo detectors 4. Therefore, the reflector 3 serves not only as a reflecting surface but also as a filter. When light from the lamp 1 illuminates the picture after being reflected by the reflecting surface 31 of the reflector 3 on which reflecting surface the color-compensating coating layer 6 is provided, the proportion of reflected light of wavelengths corresponding to the oversensitive part of the photo detectors 4 is reduced owing to the reflection by the reflecting surface 31. As a result, the combined spectral sensitivity of the optical system, which includes the lamp 1 and reflector 3, and the photo detectors 4 becomes close to the spectral luminous efficiency of a man. Even when the photo detectors 4 have an oversensitive part in their spectral sensitivity, namely, a part having sensitivity much higher compared with the spectral luminous efficiency of a man, it is still possible to read a picture with high accuracy by such simple and economical means that a color-compensating coating layer 6 is provided on the reflecting surface 31 of the reflector 3 so as to compensate the oversensitive part of the spectral sensitivity of the photo detectors 4.

Since the color-compensating coating layer 6 is formed by an anodic oxidation technique the color-compensating coating layer 6 has high thermal durability and can exhibit excellent color-compensating effects stably over a long period of time even when the reflector 3 is arranged close to the lamp 1. Owing to the use of aluminum or an aluminum alloy as a material for the reflector 3, the color-compensating coating layer 6 having desired color-compensating effects can be formed readily by an anodic oxidation technique.

Figure 5:
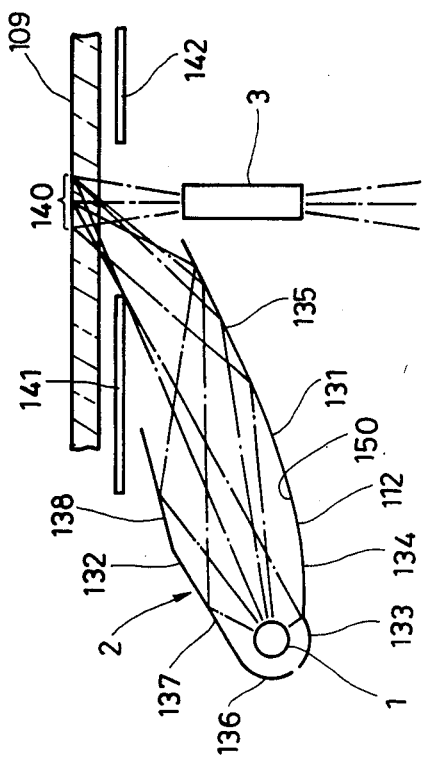
FIG. 5 illustrates schematically the reflection of light by the reflector of the machine of FIG. 4.
Figure 4:
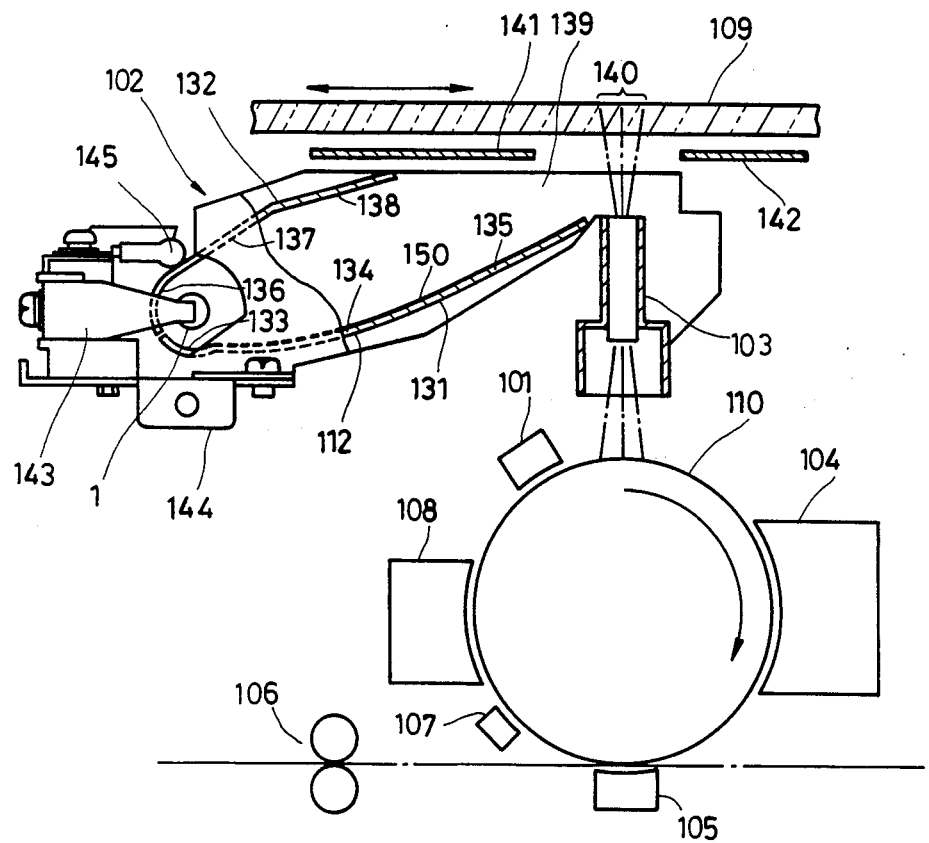
FIG. 4 is a simplified, schematic and fragmentary view of a copying machine according to a further embodiment of this invention.

In the above-described embodiment, the reflector 3 has a similar cross-sectional configuration as that shown in FIG. 4 and FIG. 5, and no light travels directly to the original picture 5 from the lamp 1.

A description will next be made of the present invention incorporated in a copying machine.

FIG. 4 is a schematic illustration of an exemplary copying machine, in which there are shown a charging means 101, an optical system 102 for illuminating each original document to form an optical image of the original document, a developing means 104, a transfer means 105, a fixing means 106, a discharging means 107, a cleaning means 108, a document table 109 made of transparent glass and a photosensitive member 110 in the form of a rotary drum.

The optical system 102 of this embodiment is constructed basically of the tubular lamp 1 for the illumination of each original document, a gutter-like, light-condensing reflector 112 made of aluminum or an aluminum alloy and surrounding the lamp 1, and a image-forming lens 103 for focusing an optical image of the original document on the photosensitive member 110.

As the lamp 1, it is possible to use, for example, a halogen incandescent lamp having a structure similar to that depicted in FIG. 3.

The reflector 112 is formed, for example, of a first, i.e., lower reflector portion 131 and a second, i.e., upper reflector portion 132 which are formed integrally. In the illustrated embodiment, as shown schematically in FIG. 5, the first reflector portion 131 and second reflector portion 132 are positionally fixed relative to the lamp 1 in such a way that light reflected by the first reflector portion 131 subsequent to projection of light from the lamp 1 onto the first reflector portion 131 travels directly toward an illumination zone 140 of the document table, while light reflected by the second reflector portion 132 subsequent to projection of light from the lamp 1 onto the second reflector portion 132 is projected to and reflected by the first reflector portion 131 and the travels toward the toward the illumination zone 140 of the document table. Namely, the first reflector potion 131 comprises a circular arc surface portion 133 having a central axis thereof coincided with the longitudinal axis of the lamp 1 and a cross-section in the form of about one forth of a circle, an ellipsoidal portion 134 extending out from the edge of the circular arc surface portion 133 and having a cross-section forming a part of an ellipse, and a plane portion 135 extending from the upper edge of the ellipsoidal portion 134 toward the document table 109. On the other hand, the second reflecting portion 132 comprises a circular arc surface portion 136 having a central axis thereof coincided with the longitudinal axis of the lamp 1, a cross-section in the form of about one forth of a circle and forming a substantially hemicircular arc reflecting surface together with the circular arc surface 133 of the first reflecting portion 131, a first plane portion 137 extending from the edge of the circular arc surface portion 136, and a second plane portion 138 extending from the upper edge of the first plane portion 137 toward the document table 109.

These first reflecting portion 131 and second reflecting portion 132 are both made of aluminum or an aluminum alloy. A layer 150 formed of a color-compensating anodic oxidation coating (hereinafter called merely "color-compensating coating layer") is provided on the entire area of the reflecting surface of one of the reflecting portions, for example, the first reflecting portion 131.

The chromaticity of the reflecting surface of the first reflecting portion 131, on which the color-compensating coating layer 150 is provided, falls within a range defined by the following equations (1)–(3) on chromaticity coordinates of a XYZ colorimetric chromaticity diagram, i.e., ICI (International Commission on Illumination) 1931 XYZ colorimetric chromaticity diagram.

$$y \leq 2.25x - 0.235 \qquad \text{Eq. 1}$$

$$y \geq -0.875x + 0.7025 \qquad \text{Eq. 2}$$

$$y \geq x - 0.16 \qquad \text{Eq. 3}$$

Figure 6:
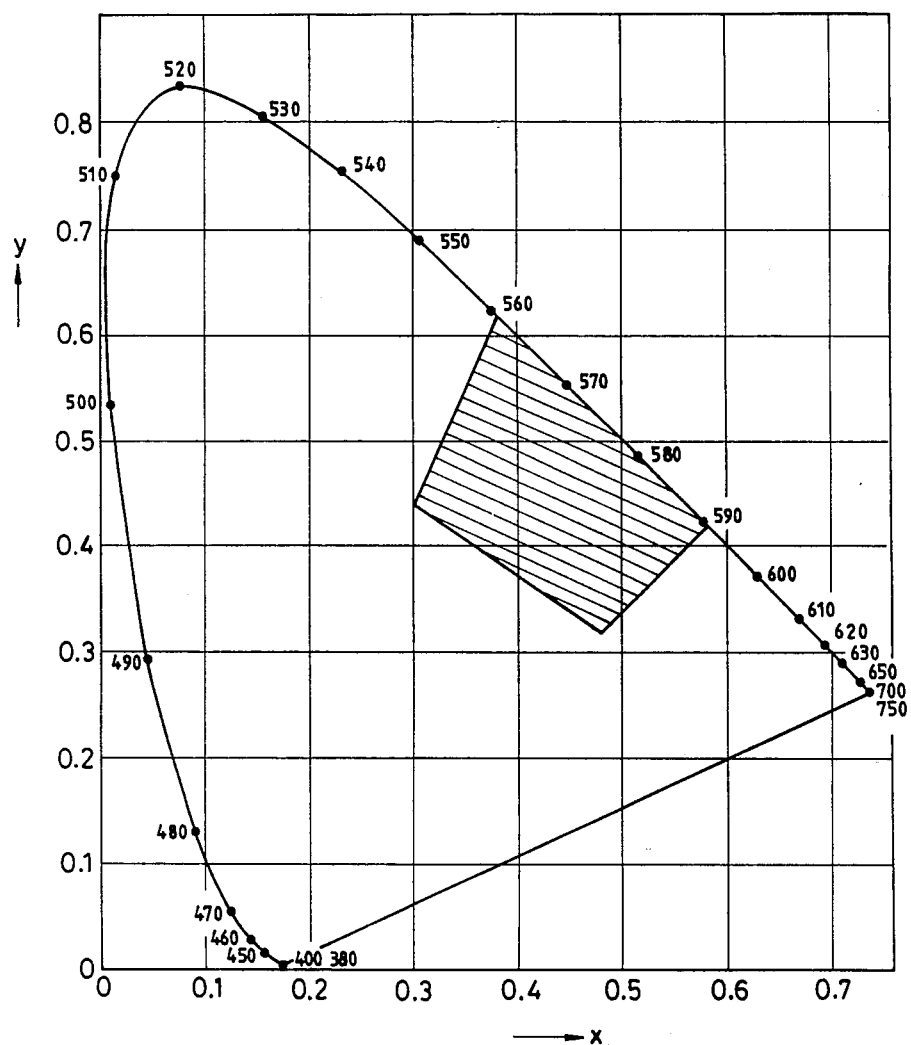
FIG. 6 shows, on an XYZ colorimetric chromaticity diagram, a first zone of chromaticity of a color-compensating anodic oxidation coating layer useful for a copying machine.

FIG. 6 shows the chromaticity coordinates of the XYZ colorimetric chromaticity diagram. The region indicated by hatching is the coordinate region satisfying the above equations (1)–(3). Namely, the hue of the reflecting surface of the first reflecting portion 131 with the color-compensating coating layer 150 provided thereon corresponds to the hue of a yellow or orange color.

The preferable thickness of the color-compensating coating layer 150 may generally be 1 μm or less. If this thickness should exceed 1 μm, the reflectivity will generally be reduced for the entire visible light, resulting in a reduction to the efficiency of light utilization.

The reflecting surface having chromaticity of such a specific region can be obtained by forming an anodic oxidation coating in accordance with an anodic oxidation treatment technique in the same manner as described above.

Specifically, the first reflecting portion 131 of the above-described shape is formed, for example, using an Al-Mg alloy (aluminum-magnesium alloy) as a material for the reflector. The first reflecting portion 131 is then subjected to anodic oxidation in an aqueous solution of sulfuric acid so as to provide a color-compensating coating layer on its reflecting surface.

Designated at numerals 141,142 are light-shielding plates. These light-shielding plates 141,142 are provided fixedly on the main body (not illustrated) of the copying machine at locations between a light-projecting opening 139 of the reflector 112 and the document table 109. In the illustrated embodiment, one of the light-shielding plates, i.e., the light-shielding plate 141 extends deep into the light-projecting opening 139 so that the light-shielding plate 141 shuts off light, which travels directly toward the illumination zone 140 of the document table 109, out of light from the lamp 1. By shutting off the light traveling directly toward the illumination zone 140 of the document table 109 out of the light from the lamp 1 in the above manner, the light illuminating the illumination zone 140 of the document table 109 is constituted substantially in its entirety by the light reflected by the color-compensating coating layer 150 of the first reflecting portion 131, whereby the color-compensating effects of color-compensating coating layer 150 are enhanced further.

Numeral 143 indicates a lamp holder made of a metal. The lamp 1 is held under pressure at both ends thereof via the contacts 29,30 by the lamp holder 143. In addition, electricity is supplied from a power source (not shown) to the lamp 1 by way of the lamp holder 143. Designated at numeral 144 is a bracket mounted fixedly on the main body of the copying machine. On the bracket 144, the reflector 112 is held in place at a side portion thereof and the lamp holder 143 is also fixed by way of an insulating material. The image-forming lens 103 is also mounted on the bracket 144. Numeral 145 indicates a thermal fuse.

The spectral sensitivity of the photosensitive member 110 contains, in a wavelength region of 400–550 nm, an oversensitive range, that is, a range in which the sensitivity is considerably higher compared with the spectral luminous efficiency. Specifically, the photosensitive member 110 is composed of an OPC photosensitive member formed for example of polyvinylcarbazole and trinitrofluorenone, a selenium-base photosensitive member formed for example of $As_2Se_3$ or SeTe, or the like.

Figure 7:
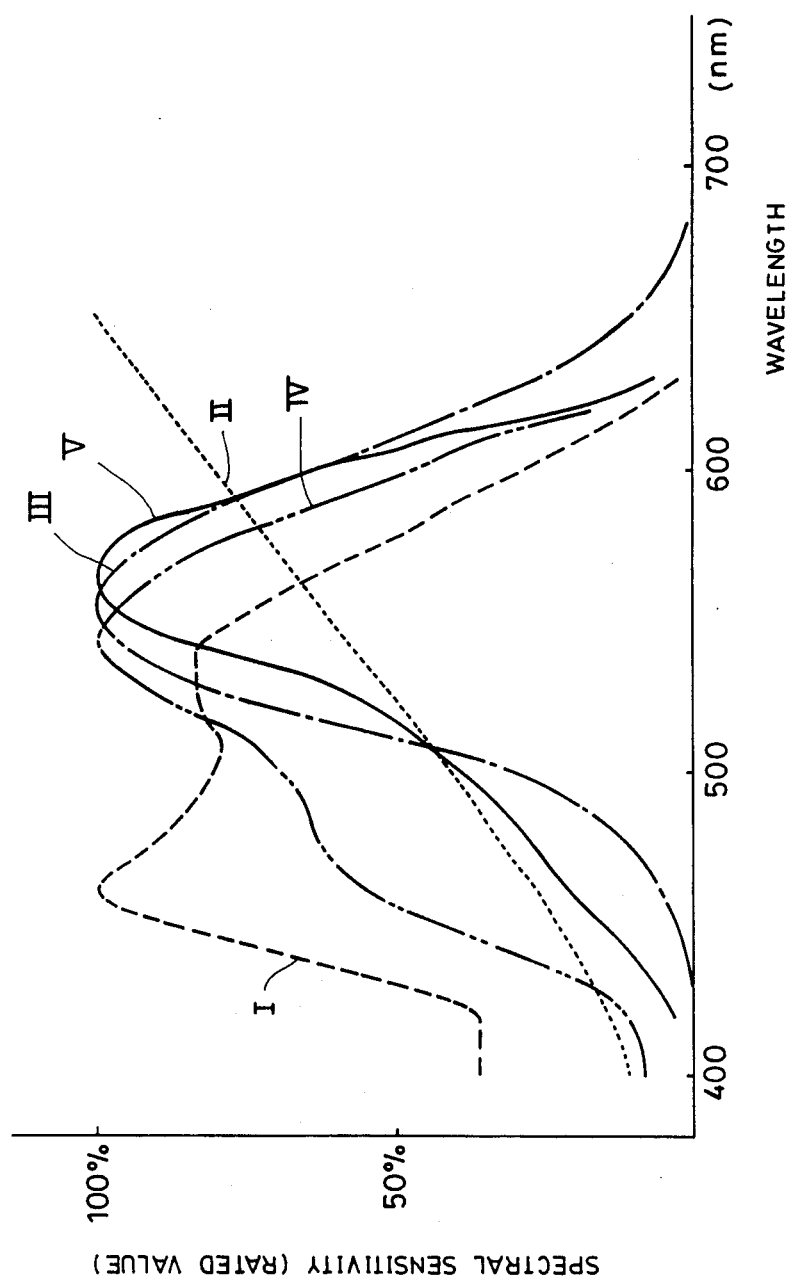
FIG. 7 is a curvilinear diagram showing the spectral sensitivity after formation of the color-compensating anodic oxidation coating layer of the zone shown in FIG. 6, in comparison with other spectral sensitivity.

FIG. 7 diagrammatically illustrates spectral sensitivity (rated values) obtained empirically.

Numeral I indicates the spectral sensitivity curve of an OPC photosensitive member a employed as a photosensitive member. The OPC photosensitive member a has the maximum peak of spectral sensitivity at about 460 nm and contains, in a wavelength region of 400–550 nm, an oversensitive range, that is, a range in which the sensitivity is considerably higher compared with the spectral luminous efficiency.

Numeral II indicates the spectral sensitivity curve of a comparative optical system d constructed by using a halogen incandescent lamp b (color temperature during lighting: 2900K) as a lamp for the illumination of each original document and an aluminummade reflector c having no color-compensating coating layer (its reflecting surface having chromaticity of x=0.3015, y=0.3210 on the XYZ colorimetric chromaticity diagram) as a reflector.

Numeral III indicates the spectral luminous efficiency curve for photopic vision ($10$–$10^5$ Lx).

Numeral IV indicates the combined spectral sensitivity curve of the OPC photosensitive member a and comparative optical system d.

Numeral V indicates the combined spectral sensitivity curve of the OPC photosensitive member a and an optical system f constructed by using the halogen incandescent lamp b as a lamp for the illumination of each original document and an aluminum-made reflector e provided with a color-compensating coating layer (its reflecting surface having chromaticity of x=0.4439, y=0.4290 on the XYZ colorimetric chromaticity diagram) as a reflector. The spectral sensitivity curve V is a spectral sensitive curve obtained by applying the present invention.

As is understood from the spectral sensitivity curve V shown in FIG. 7, it is possible to obtain spectral sensitivity close to the spectral luminous efficiency curve III for photopic vision when the OPC photosensitive member a, the spectral sensitivity of which contains an oversensitive range in the wavelength region of 400–550 nm, is used in combination with a reflector having a reflecting surface the chromaticity of which falls within a specific range by the provision of a color-compensating coating layer on the reflecting surface. As a result, it is possible to provide sufficient density with a marked area of a duplicate copy, corresponding to a marked area of a blue color in an original document. Since spectral sensitivity close to the spectral luminous efficiency curve III for photopic vision can be obtained over the entire wavelength region of visible light in the present embodiment, it is possible to reproduce a good picture without the problem of insufficient density even when the picture is duplicated by using, as an original document, a picture containing marked areas of various colors.

On the other hand, as is understood from the spectral sensitivity curve IV, the combined use of the reflector having no color-compensating coating layer results in spectral sensitivity still high and different considerably from the spectral luminous efficiency curve III for photopic vision in the wavelength region of 400–550 nm. Therefore, the density of a marked area of a duplicate copy corresponding to a marked area of a blue color in an original document becomes insufficient.

In the above embodiment, the reflecting surface of the reflector 112 made of aluminum or the aluminum alloy has the color-compensating coating layer 150 and the chromaticity of the reflecting surface falls within the specific range. The reflector 112 serves not only as a reflecting surface but also as a filter. When the light from the illuminating lamp 1 illuminates an original document subsequent to its reflection by the reflecting surface of the reflector 112 which reflecting surface is provided with the color-compensating coating layer 150, the proportion of light having a yellow or orange hue which is in a complementary relation with a blue hue increases relative to the light of other hues in the reflected light. The original document is illuminated by such reflected light. As a result, an optical image of the original document is formed on the photosensitive member in such a state that the quantity of light reflected from a marked area of a blue color in the original document is reduced relative to that of light reflected from other marked areas. By the simple and economical method of providing the color-compensating coating layer 150 on the reflecting surface of the reflector 112 to adjust the chromaticity of the reflecting surface to a specific range when there is used a photosensitive member the spectral sensitivity of which contains an oversensitive range in the wavelength region of blue colors, namely, a part in which the sensitivity is considerably higher compared with the spectral luminous efficiency, it is possible to provide sufficient density to a marked area of a duplicate copy corresponding to a marked area of a blue color in an original document. As a result, a good duplicate picture can be formed.

In the optical system 102 of the above embodiment, the metal-made reflector 112 is composed of the first reflecting portion 131 and second reflecting portion 132 and the color-compensating coating layer 150 is formed over the entire area of the reflecting surface of the first reflecting portion 131. The positional relation between the reflector 112 and lamp 1 is determined in the following manner. Of the light from the lamp 1, the light traveling toward the lower, i.e., first reflecting portion 131 is reflected by the first reflecting portion 131 and is then projected onto the illumination zone 140 of the document table 109. Of the light from the lamp 1, the light traveling toward the upper, i.e., second reflecting portion 132 is reflected by the second reflecting portion 132, projected onto the lower, i.e., first reflecting portion 132, and reflected again by the first reflecting portion 131, and then projected onto the illumination zone 140 of the document table 109. Moreover, the light traveling directly from the lamp 1 to the illumination zone 140 is shut up by the light-shielding plate 141. Light which illuminates the illumination zone 140 of the document table 109 is therefore constituted substantially in its entirety by the light reflected by the color-compensating coating layer 150. Moreover, the illumination zone 140 is not impaired by direct light from the lamp 1. As a result, the light which illuminates the illumination zone 140 has spectral characteristics compensated precisely in accordance with the chromaticity of the reflecting surface having the color-compensating coating layer 150 provided thereon. Moreover, the color-compensating coating layer 150 is formed only one of the reflecting portions, i.e., on the first reflecting portion 131. The reduction in quantity of illuminating light can hence be made smaller compared with the formation of another color-compensating coating layer on the second reflecting portion 132, thereby providing an excellent optical system.

Since the color-compensating coating layer 150 is formed by an anodic oxidation technique, the color-compensating coating layer 150 has high thermal durability and can exhibit excellent color-compensating effects stably over a long period of time even when the reflector 112 is arranged close to the lamp 1. Owing to the use of aluminum or an aluminum alloy as a material for the reflector 112, the color-compensating coating layer 150 can be formed readily by an anodic oxidation technique and a reflecting surface having chromaticity within such a specific range as described above can be formed with ease.

The color-compensating coating layer 150 is provided on the reflector 112 which is used in combination with the lamp 1 for the illumination of each original document and is made of aluminum or an aluminum alloy. The original document is hence illuminated by light from the reflector 112. It is hence possible to achieve color compensation without deleteriously affecting the sharpness of the optical image of the original document. If a color-compensating anodic oxidation coating is provided on a reflector adapted to reflect the optical image of the original document on the contrary, the sharpness of the optical image of the original document is reduced due to the roughness and the like of the color-compensating anodic oxidation coating.

Instead of the above-described color-compensating coating layer, a color-compensating coating layer having chromaticity in a range defined by the following equations (4)-(6) on chromaticity coordinates of an XYZ colorimetric chromaticity diagram, i.e., ICI (International Commission on Illumination) 1931 XYZ colorimetric chromaticity diagram is also useful.

$$y \leq 0.1778x + 0.3338 \quad \text{Eq. 4}$$

$$y \leq -10x + 2.98 \quad \text{Eq. 5}$$

$$y \geq 1.1667x - 0.1467 \quad \text{Eq. 6}$$

Figure 8:
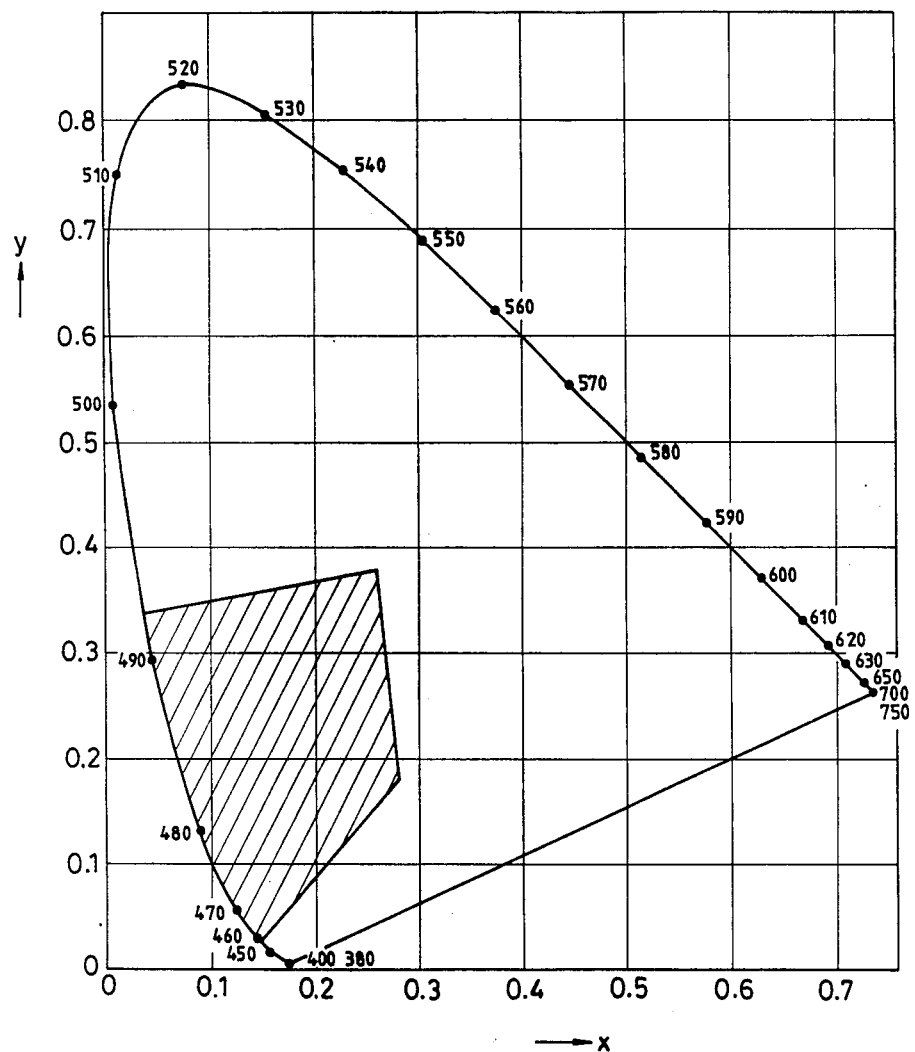
FIG. 8 shows, on the XYZ colorimetric chromaticity diagram, a second zone of chromaticity of a color-compensating anodic oxidation coating layer useful for the copying machine.

FIG. 8 shows the chromaticity coordinates of the XYZ colorimetric chromaticity diagram. The region indicated by hatching is the coordinate region satisfying the above equations (4)-(6). Namely, the hue of the reflecting surface of the first reflecting portion 131 with the color-compensating coating layer provided thereon corresponds to the hue of a blue color.

This color-compensating coating layer can be formed by applying the anodic oxidation treatment under conditions different from those employed to provide the above-described color-compensating coating layer.

Here, the spectral sensitivity of the photosensitive member 110 contains, in a wavelength region of 550–650 nm, an oversensitive range, that is, a range in which the sensitivity is considerably higher compared with the spectral luminous efficiency. Specifically, the photosensitive member 110 is composed of an OPC photosensitive member formed of an eutectic mixture for example of a triphenylmethane mixture and a thiapyrylium salt or the like, a selenium-base photosensitive member formed for example of AsSe, or the like.

Figure 9:
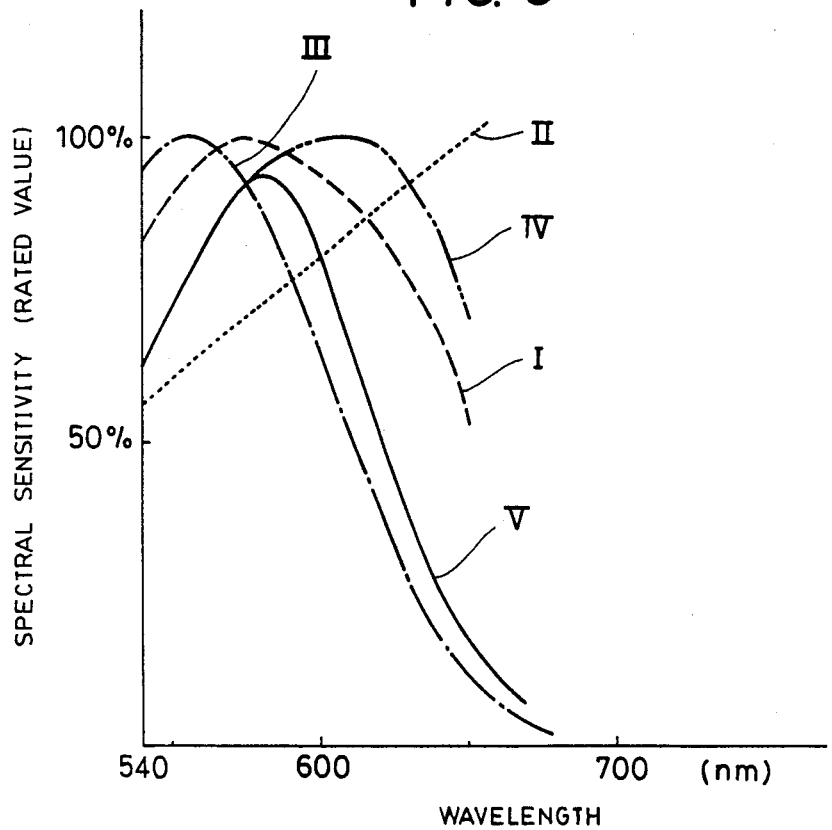
FIG. 9 is a curvilinear diagram showing the spectral sensitivity after formation of the color-compensating anodic oxidation coating layer of the zone shown in FIG. 8, in comparison with other spectral sensitivity.

FIG. 9 diagrammatically illustrates spectral sensitivity (rated values) obtained empirically.

Numeral I indicates the spectral sensitivity curve of an OPC photosensitive member h employed as a photosensitive member. The OPC photosensitive member h has the maximum peak of spectral sensitivity at about 575 nm and contains, in a wavelength region of 550–650 nm, an oversensitive range, that is, a range in which the sensitivity is considerably higher compared with the spectral luminous efficiency.

Numeral II indicates the spectral sensitivity curve of a comparative optical system k constructed by using a halogen incandescent lamp i (color temperature during lighting: 2900K) as a lamp for the illumination of each original document and an aluminum-made reflector j having no color-compensating coating layer (its reflecting surface having chromaticity of x=0.3015, y=0.3210 on the XYZ colorimetric chromaticity diagram) as a reflector.

Numeral III indicates the spectral luminous efficiency curve for photopic vision (10–$10^5$ Lx).

Numeral IV indicates the combined spectral sensitivity curve of the OPC photosensitive member h and comparative optical system k.

Numeral V indicates the combined spectral sensitivity curve of the OPC photosensitive member h and an optical system m constructed by using the halogen incandescent lamp i as a lamp for the illumination of each original document and an aluminum-made reflector j provided with a color-compensating coating layer (its reflecting surface having chromaticity of x=0.185, y=0.240 on the XYZ colorimetric chromaticity diagram) as a reflector. The spectral sensitivity curve V is a spectral sensitive curve obtained by applying the present invention.

As is understood from the spectral sensitivity curve V shown in FIG. 9, it is possible to obtain spectral sensitivity close to the spectral luminous efficiency curve III for photopic vision in the wavelength region of the red colors when the OPC photosensitive member h, the spectral sensitivity of which contains an oversensitive range in the wavelength region of 550–650 nm, is used in combination with a reflector having a reflecting surface the chromaticity of which falls within a specific range by the provision of a color-compensating coating layer on the reflecting surface. As a result, it is possible to provide sufficient density with a marked area of a duplicate copy, corresponding to a marked area of a red color in an original document.

On the other hand, as is understood from the spectral sensitivity curve IV, the combined use of the reflector having no color-compensating coating layer results in spectral sensitivity high and different considerably from the spectral luminous efficiency curve III for photopic vision in the wavelength region of the red colors. Therefore, the density of a marked area of a duplicate copy corresponding to a marked area of a red color in an original document becomes insufficient.

Other merits are the same as those brought about by the preceding embodiment.

The present invention has been described on the basis of the embodiments. In the present invention, the type and shape of the lamp for the illumination of each original document, the configuration of the reflector, etc. may be suitably changed as needed. For example, a reflector having a structure other than that depicted in FIG. 4 may be used. Although a color-compensating anodic oxidation coating layer may be formed on the entire area of a reflector, it is also possible to divide the reflecting surface of the reflector into plural portions and to provide a color-compensating anodic oxidation coating layer only on a part of the reflector as in the above-described copying machine. As another alternative, another color-compensating anodic oxidation coating layer having different characteristics may be provided on another part of the reflector. When a plurality of reflectors is used for illuminating original document, it is possible to provide color-compensating anodic oxidation coating layers of different characteristics on the reflectors respectively.

As has been described above, the present invention allows, with simple and economical means, to conduct color compensation by modifying the optical characteristics of the optical image of an original document in accordance with the spectral sensitivity characteristics of a photosensitive member. As a result, the present invention provides an image processing apparatus which can achieve good image processing, more specifically, a picture reader capable of modifying the spectral characteristics of the optical image of an original document and reading the original document with high accuracy as well as a copying machine capable of providing sufficient density to a duplicated area corresponding to a marked area of a red or blue color in an original document and hence forming good duplicate picture even when such an original document is used.

I claim:

1. An image processing apparatus equipped with an original document illuminating lamp, a reflector arranged in association with the lamp and having a color-compensating anodic oxidation coating formed on at least a part of a reflecting surface of the reflector, and a photosensitive member adapted to receive light from an original document upon exposure of the original document to light from the lamp and having an oversensitive range in the spectral sensitivity characteristics thereof, characterized in that the reflector is made of aluminum or an aluminum alloy and owing to the provision of the color-compensating anodic oxidation coating, the reflectivity of the reflector to light in a wavelength region corresponding to the oversensitive range of the photosensitive member is smaller than its reflectivity to light in wavelength region other than the first-mentioned wavelength region.

2. The image processing apparatus as claimed in claim 1, wherein the photosensitive member is a photoelectric member making use of photovoltaic effects of a p-n junction of silicon.

3. The image processing apparatus as claimed in claim 1, wherein the original document illuminating lamp is a halogen incandescent lamp.

4. The image processing apparatus as claimed in claim 1, wherein the thickness of the color-compensating anodic oxidation coating is 1 $\mu$m or less.

5. The image processing apparatus as claimed in claim 1, wherein the reflector is divided into plural sections and the color-compensating anodic oxidation coating is formed on at least on of the sections.

6. The image processing apparatus as claimed in claim 5, wherein the reflector is divided into plural sections including first reflector and second reflector sections, light reflected by the first reflector section travels directly toward the original document, and light reflected by the second reflector section travels toward the original document by way of the first reflector section.

7. An image processing apparatus equipped with an original document illuminating lamp, a reflector arranged surrounding the lamp and having a color-compensating anodic oxidation coating formed on at least a part of a reflecting surface of the reflector, and a photosensitive member comprising a photoconductor adapted to receive light from an original document upon exposure of the original document to light from the lamp and having an oversensitive range in the spectral sensitivity characteristics thereof, characterized in that the reflector is made of aluminum or an aluminum alloy and owing to the provision of the color-compensating anodic oxidation coating, the reflectivity of the reflector to light in a wavelength region corresponding to the oversensitive range of the photosensitive member is smaller than its reflectivity to light in wavelength region other than the first-mentioned wavelength region.

8. The image processing apparatus as claimed in claim 7, wherein the photosensitive member has the oversensitive range in a wavelength range of 400–550 nm and the chromaticity of said part of the reflecting surface, on which the color-compensating anodic oxidation coating is formed, falls within a range defined by the following equations (1)–(3) on the chromaticity coordinates of an XYZ colorimetric chromaticity diagram:

$$y \leq 2.25x - 0.235 \qquad \text{Eq. 1}$$

$$y \geq -0.875x + 0.7025 \qquad \text{Eq. 2}$$

$$y \geq x - 0.16. \qquad \text{Eq. 3}$$

9. The image processing apparatus as claimed in claim 7, wherein the photosensitive member has the oversensitive range in a wavelength range of 550–650 nm and the chromaticity of said part of the reflecting surface, on which the color-compensating anodic oxidation coating is formed, falls within a range defined by the following equations (4)–(6) on the chromaticity coordinates of an XYZ colorimetric chromaticity diagram:

$$y \leq 0.1778x - 0.3338 \qquad \text{Eq. 4}$$

$$y \leq -10x + 2.98 \qquad \text{Eq. 5}$$

$$y \geq 1.1667x - 0.1467. \qquad \text{Eq. 6}$$

10. The image processing apparatus as claimed in claim 7, wherein the original document illuminating lamp is a halogen incandescent lamp.

11. The image processing apparatus as claimed in claim 7, wherein the thickness of the color-compensating anodic oxidation coating is 1 $\mu$m or less.

12. The image processing apparatus as claimed in claim 7, wherein the reflector is divided into plural sections and the color-compensating anodic oxidation coating is formed on at least one of the sections.

13. The image processing apparatus as claimed in claim 12, wherein the reflector is divided into plural sections including first reflector and second reflector sections, light reflected by the first reflector section travels directly toward the original document, and light reflected by the second reflector section travels toward the original document by way of the first reflector section.

* * * * *

UNITED STATES PATENT AND TRADEMARK OFFICE
CERTIFICATE OF CORRECTION

PATENT NO. : 4,769,718

DATED : September 6, 1988

INVENTOR(S) : Kenji Imamura

It is certified that error appears in the above-identified patent and that said Letters Patent is hereby corrected as shown below:

Claim 5, line 4, change "on" (second occurrence) to --one--.

Signed and Sealed this

Fourteenth Day of February, 1989

Attest:

DONALD J. QUIGG

*Attesting Officer*     *Commissioner of Patents and Trademarks*